United States Patent [19]

Pavanel

[11] Patent Number: 4,998,708

[45] Date of Patent: Mar. 12, 1991

[54] BUTTERFLY VALVE WITH A SEALING ELEMENT OF ELASTOMERIC MATERIAL WITH AN INTERNAL METAL REINFORCEMENT

[75] Inventor: Roberto Pavanel, Osnago, Italy

[73] Assignee: Cazzaniga S.p.A., Milan, Italy

[21] Appl. No.: 407,959

[22] Filed: Sep. 15, 1989

[30] Foreign Application Priority Data

Oct. 6, 1988 [IT] Italy ................ 22211 A/88

[51] Int. Cl.$^5$ ................ F16K 1/22
[52] U.S. Cl. ................ 251/306; 251/317
[58] Field of Search ............ 251/305, 306, 316, 317

[56] References Cited

U.S. PATENT DOCUMENTS

| | | | |
|---|---|---|---|
| 3,311,128 | 3/1967 | Taylor | 251/306 X |
| 3,537,683 | 11/1970 | Smell, Jr. | 251/306 |
| 3,782,684 | 1/1974 | Stephens et al. | 251/306 |
| 4,225,113 | 9/1980 | Barthehemy et al. | 251/306 |
| 4,685,611 | 8/1987 | Scobie et al. | 251/306 |

FOREIGN PATENT DOCUMENTS 3203374 8/1983 Fed. Rep. of Germany ...... 251/306

Primary Examiner—John C. Fox
Attorney, Agent, or Firm—Herbert Dubno

[57] ABSTRACT

Butterfly valve with a sealing element in elastomeric material with an internal metal reinforcement, made of a substantially tubular outer valve body, with flow pipe connections for fluids at its extremities, in whcih there is a seal in elastomeric material encircling a disc-shaped, internally mobile shutter, equipped with a diametral axis shaft transversal to the valve body axis, protruding out of the same body and bearing the rotation commanding organs, the sealing element being equipped with an inside metal ring, axially extended substantially for the entire length of the same sealing element, and with external sealing reliefs, in correspondence of which there are related seatings in the external body, an ample elastic deformation of the elastomeric material being allowed in the sealed areas, made of a substantially tubular outer valve body, with flow pipe connections for fluids at its extremities, in which there is a seal in elastomeric material encircling a disc-shaped, internally mobile shutter, equipped with a diametral axis shaft protruding out of the body, with rotation controlling organs, transversal to the valve body axis, the sealing element being equipped with an inside metal ring, axially extended substantially for the entire length of the sealing element, and with external sealing reliefs, in correspondence of which there are related seatings in the external body, an ample elastic deformation of the elastomeric material being allowed in the sealed areas.

5 Claims, 2 Drawing Sheets

BUTTERFLY VALVE WITH A SEALING ELEMENT OF ELASTOMERIC MATERIAL WITH AN INTERNAL METAL REINFORCEMENT

FIELD OF THE INVENTION

The present invention relates to a butterfly valve with a sealing element in elastomeric material with an internal metal reinforcement.

BACKGROUND OF THE INVENTION

For controlling flow in conducts in many fields of application, particularly in hydraulic and pneumatic installations, as in the case of hydraulic, heating, irrigation, compressed air distribution and so on, valves with special characteristics are widely used. Such valves, among other things, must provide a high degree of resistance to the fluid even in the presence of high pressures, they must be easily nd quickly maneuverable, offer limited head loss in the "open" position and, furthermore, be of low cost.

For this purpose so-called "ball" valves are widely used. These valves, however, even though offering a good performance, are relatively expensive, due to the number of parts they are made of and the assembling operations thereof, and require, especially when of larger dimensions, a great deal of stress when the valve is manipulated.

So-called "butterfly" valves are also known. These valves feature a substantially disc-shaped shutter, which can be rotated between a position transversal to the flow, where it effects blocking, and a position parallel to the flow in which passage of the fluid is allowed.

To form the seals in these valves, contact metal surfaces can be provided which, however, do not guarantee a full sealing. Valves where a gasket of elastomeric material is set in the perimeter of the disc and seals against the inner surface of the valve body are also known; these valves, however, display problems concerning the shutter closure, after a certain period of inactivity, due to the fact that the gasket stressed seating of the shutter contrasting its deformation in one differently when the shutter is closed and when the shutter is open.

This state of stress gives rise to, with a deformation wide enough to realize the sealing, to values near to or exceeding the limit of elastic deformability of the material and under such conditions permanent modifications of the seal material can occur which can affect the seal and even bring about adhesion.

Such valves, furthermore, tend to be costly, as they require mechanical work for both seating of the gasket on the shutter and stressing of the sealing surface of the gasket against the valve body, and also display, due to the space longitudinally occupied by the gasket, high flow head losses. Valves of the butterfly type are also known, whith a sealing element made of a ring of elastomeric material housed in the external body, which however presents sealing problems between the outer, smooth surface of the external body, and the valve body, because the seal is realized on a very wide surface and with limited radial loads. In filtrations of fluid between the sealing element and the valve body can moreover, give rise to an inward buckling of the sealing element, which has a low rigidity because of its elastic deformability which must be sufficient to ensure proper sealing. Therefore these valves are found to be suitable only for use at limited pressure values. Beside, these valves, due to the characteristics of the sealing material, are used only with water.

OBJECTS OF THE INVENTION

It is therefore, an object of the invention to provide a butterfly type valve which is inexpensive to manufacture and is capable of ensuring, at the same time, high performance standards either with water or with various fluids or gases, even at high pressures, long-term durability and absence of seizure even following inactivity periods, while also offering a reduced flow head loss. It is another object to provide a valve suitable for automated assembling using simple equipment, in order to reduce the production costs.

SUMMARY OF THE INVENTION

Such results are achieved by this invention, which comprises a butterfly valve made of a substantially tubular valve body, with flow pipe connections for fluids at its extremities, in which is a seal in elastomeric material encircling a disc-shaped, internally mobile shutter, equipped with a diametral axis shaft transverse to the valve body axis, protruding out of the same body and bearing the rotation commanding organs. The sealing element is equipped with an internal metal ring, axially extending substantially for the entire length of the same sealing element, and with external sealing reliefs, in correspondence of which there are related seatings in the external body, an ample elastic deformation of the elastomeric material being allowed in the sealed areas.

The inside metal ring of the sealing element in elastomeric material has a median area, in correspondence with the area in contact with the shutter, with a diameter substantially equal to the external diameter of the sealing element, a relatively thick layer of the resilient material being present between the metal ring and the shutter. This ring has two extremities both in correspondence with the external sealing reliefs of the sealing element, which areas have a reduced diameter capable of leaving, between the outer surface of the sealing element and the surface of the metal ring, an elastomeric material thickness at least equal to the sealing reliefs protruding out of the surface of the sealing element. The sealing element in elastomeric material presents at least one axial hole transversal to the axis of the same element, suitable for the passage of the shaft anchored to the shutter, a corresponding hole in the inside metal ring being present, with a larger diameter than the diameter of the hole in the elastomeric material, such as to leave thickness of elastomeric material between the inner surface of the hole and the metallic material of the inside ring able to allow the installation of the shaft with an elastic swell sufficient to ensure the sealing, without exceeding the elastic limit of the elastomeric material. The shutter is made of a substantially disc-shaped element, the seal between shutter and sealing element being placed in areas located laterally to the line of intersection of the same disc with its meridian plane of symmetry. The shutter has a diametral hole in which the shutter shaft is inserted and anchored by forced mating, with the aid of a threaded profile on the surface of the same shaft. The external sealing reliefs of the sealing element have a semicircular section protruding out of the outer surface of the same sealing element. The sealing element is axially resistant to compression thanks to the metal ring placed inside.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
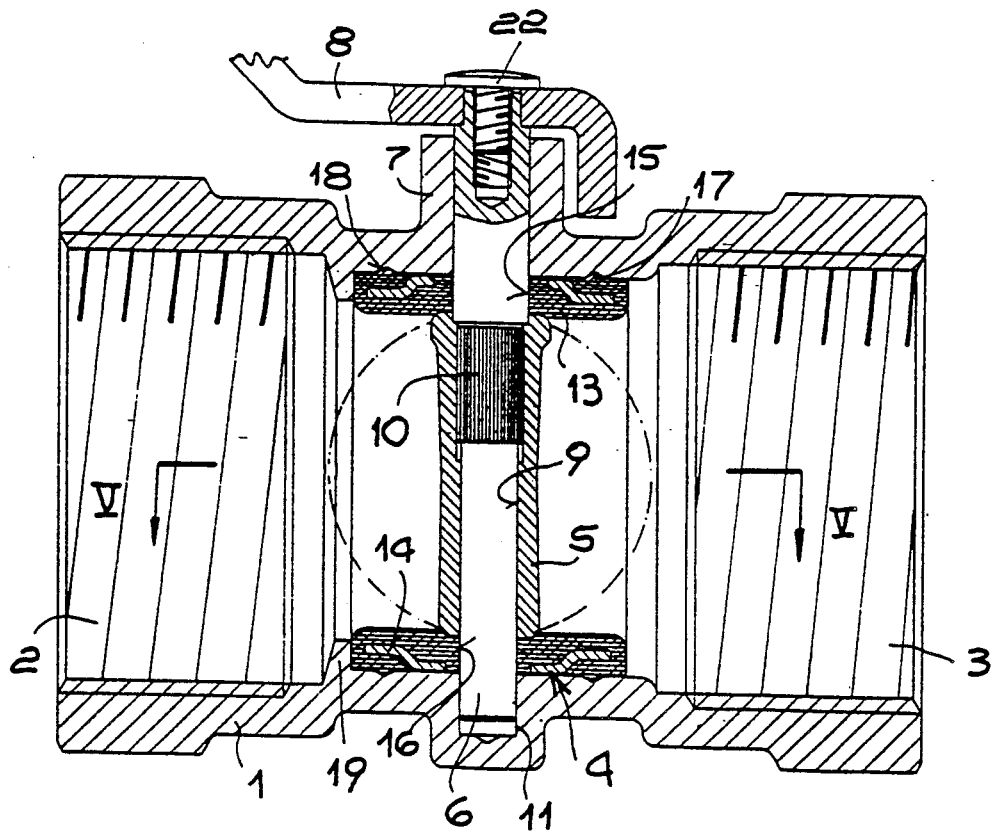
FIG. 1 is an axial section of a valve according to the invention.

As is shown in FIG. 1, a valve according to the invention, of the kind commonly referred to as "butterfly valve", includes an external body 1, equipped with fittings 2,3 connectable to a conduit, for instance of the threaded kind as per the illustration, or shaped for other known ways of connection, such as flanges, welds or the like.

Inside body 1 there is a sealing element 4, in which a substantially disc-shaped shutter 5 is received. The shutter is equipped with a shaft 6 extending through the collar 7 of body 1 and carrying at its external extremity, an actuating lever 8. In the form as illustrated in FIG. 1, which is suitable for valves of dimensions bigger than a certain value, in relation with the mechanical characteristics of the material used and the scaling of the parts, for example superior to 1" (25.4 mm), the shaft 6 goes completely across the crossing hole 9 of the shutter, and is blocked from rotation relative to the shutter by the milled profile 10. The shaft 6 is also received in a seating 11 inside the body 1. In the version shown in FIG. 2, which is suitable for valves of smaller dimensions, the shaft 6a supports a shutter 5a from one side. The shaft 6a is inserted in the blind bore 12. The sealing, in both versions, is ensured by an element 4, inserted in a respective seat of the body 1 and pressing elastically against the perimeter of the shutter 5 or 5a, when the shutter is in "closed" position.

Figure 2:
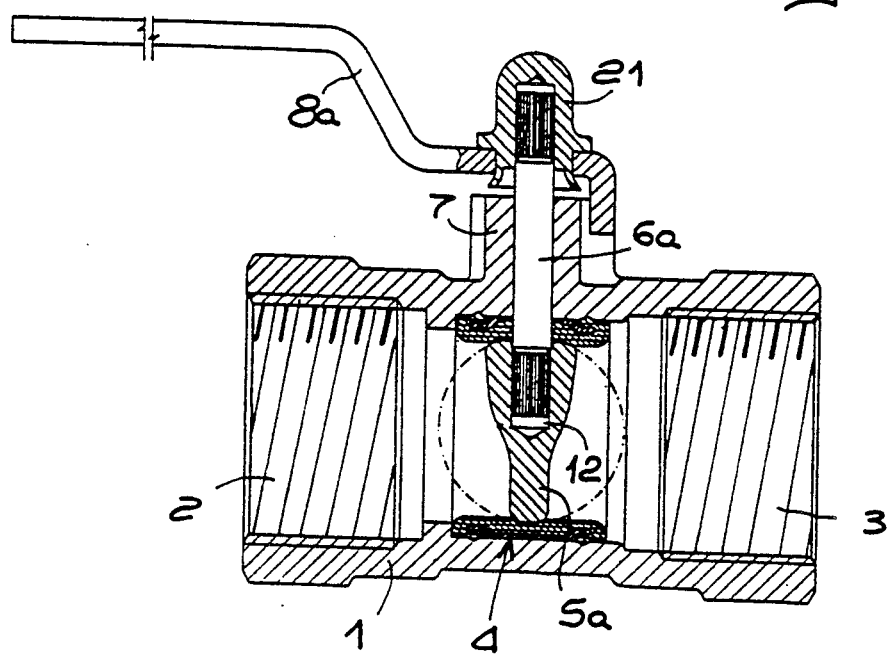
FIG. 2 is an axial section of another embodiment of a valve according to the invention.

The perimeter of the shutter, in both FIGS. 1 and 2, is shown in the "open" position with a broken line.

Figure 4:
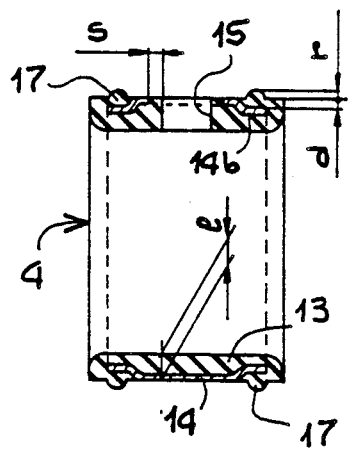
FIG. 4 is a detail cross section of a sealing element of a valve.

The element 4, shown in FIG. 4, is made of a hollow cylindrical body of elastomeric material 13, in which a shaped metal ring 14 is incorporated in the pressing phase. The ring M extends axially for a prevailing part of the length of the body. A radial hole 15, aligned with the collar 7, allows the shaft 6 to pass through and, in correspondence with it, a hole 16 (FIG. 1) permits the shaft to reach seating 11.

Figure 5:
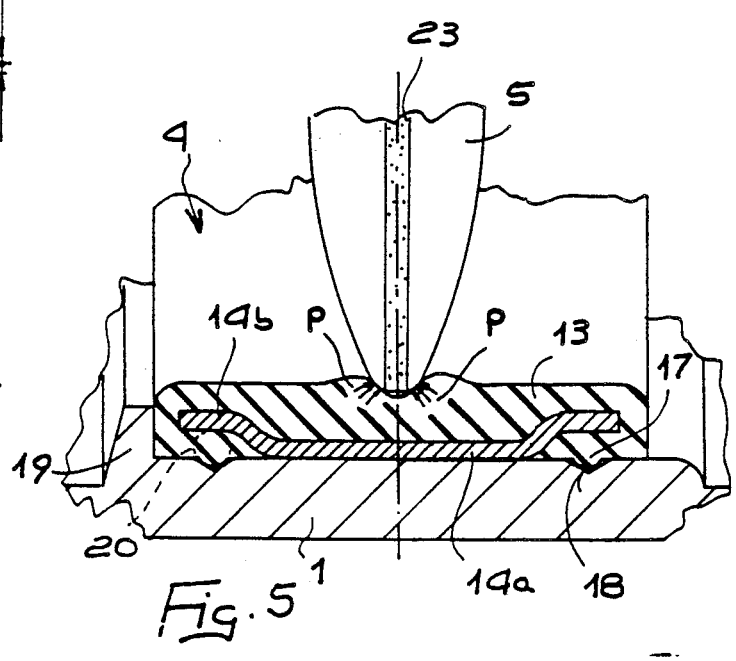
FIG. 5 is an enlargement of a portion of the sealing element and of the valve shutter taken along the line V—V of FIG. 1.

On the outer surface of element 4 there are two annular ribs 17 of semicircular section, in correspondence to which the body 1 has respective grooves 18, better visible in FIG. 5, in which the reliefs 17 are housed with an elastic deformation capable of ensuring the sealing between the element 4 and the inner wall of the valve body 1. An inwardly projecting rib 19 inside the valve body constitutes a ledging surface at an extremity of the sealing element, thus easing the assembly, a described hereinafter.

As shown in FIG. 5, the metal ring 14 has a central portion 14a with a diameter substantially equal to the external diameter of the element 4; at the extremities, on the contrary, the ring 14 shows the portions 14b with an outer diameter less than the diameter of the element 4, thus leaving a thickness "d" of elastomeric material between the portions 14b and the outer surface of the element For more convenience, this layer is substantially equal in thickness to the height "r" of protrusion of the ribs 17, located at the same extremities. Therefore, between the portion 14b and the supporting surfaces of the seating 18, a thickness of elastomeric material is included, substantially corresponding to the area occupied by a toroidal gasket 20 with a "r+d" diameter, shown in the illustration with a dashed line, thus realizing optical sealing conditions, similar to the performance offered by an "O-ring" toroidal gasket, well renowned thanks to the width of the elastic total excursion the elastomeric material is permitted.

In correspondence with the hole 15, as indicated in FIG. 4, and also in correspondence with the hole 16, whether existing, the metal ring 14 has a hole with an inside diameter superior to the diameter of hole 15 or 16, to leave thickness a "s" shim of elastomeric material between the hole edge and the hole border of the metal ring. Such a thickness "s" shim allows an insertion of the 6 or 6a shaft, with elastic deformation of the elastomeric material 13 of the element 4, such as to ensure the sealing on the surface of the same shaft outward, without requiring further gasket elements on the same shaft within the collar 7.

In its intermediate position 14a the metal ring 14 is designed to leave a thickness "e" of elastomeric material 13, as shown in FIG. 4, raised enough to offer an elastic compliance towards the shutter 5 which ensures its sealing capability against its outline when in "closed" position.

In fact, the deformation of the elastomeric material shows a high value; however, the relative deformation, i.e. the ratio between the amplitude of the deformation and the thickness of the material experiencing it, remains within limited values, thanks to the thickness "e" and also the possibility of bulging of the same material laterally to the shutter is left, as shown, in an enlarged form to enhance the phenomenon, in FIG. 5.

This, then, gives rise to a high elastic interference, as described above, between shutter and sealing element, which ensures an optimal sealing capability even under considerable pressures, without it requiring to exceed or approach the limit of elastic deformation of the elastomeric material, thereby avoiding permanent deformation of the material, adhesion to the sealing surface after a certain inactivity period and similar mishaps, which can occur along with a greater relative deformation of the material itself. The structure, according to the invention, is convenient from an economic point of view, because it reduces the number from parts of which the valve is made up and permits a particularly simple assembly, realizable through automated processes.

Figure 3:
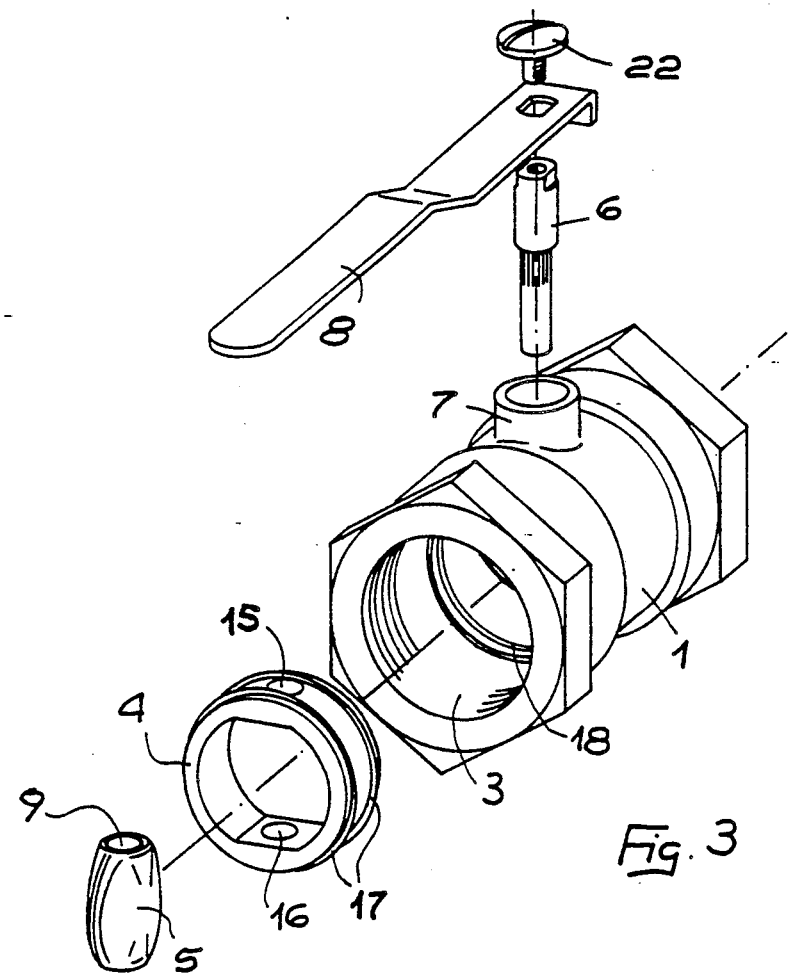
FIG. 3 is an exploded view showing the main components of a valve according to the invention, aligned according to the correct automatic assembling sequence.

In fact, as can be noted from FIG. 3, where the parts are shown aligned in the assembling sequence, the assembly process firstly involves the insertion of the sealing element in the valve body up to the ledge against the relief 19; this can be achieved through a pressing device, thanks to the rigidity given to the sealing element by the internal metal ring 14, which makes it capable of withstanding an axial pressing action without deformation.

The alignment between the hole 15 and the collar 7 can be easily obtained through a simple device connected to the presser.

Subsequently, the shutter 5, or 5a, is inserted with its hole 9 or 12 aligned with the hole 15 and the collar 7, then the shaft 6 or 6a which locks in the shutter through the threaded profile 10 is inserted. In the case of valves of small dimensions, as per version illustrated in FIG. 2, the maneuvering lever 8a, and the related fastening cap 21, are also locked in the shaft 6a by pressing. In the case of valves of greater dimensions, in the realized form as in FIG. 1, the maneuvering lever 8 is held in place by the screw 22.

According to a further aspect of the invention, it is particularly advantageous to form the shutter preferably in brass, by forming, removing the rags in correspondence with the meridian plane by trimming, without any further work on the tool in those areas.

In fact, although the removal of the forming rags by way of trimming leaves a rough area 23 along the perimeter of the shutter, as shown in a magnified form in FIG. 5, the seal is realized on the areas of maximum pressure of the elastomeric material ion the shutter denoted with the P arrows in FIG. 5, where the shutter has smooth forming surfaces.

In the central zone of the contact area between sealing element and shutter, in correspondence with the area 23 of the shutter itself, the elastomeric material of the sealing element tends to assume a continuously curving position, as magnified in FIG. 5 for greater graphic enhancement, which therefore is deflected away from the shutter, or at least results in a noticeable decrease of the elastic reaction load on the rough area 22. The latter, therefore, is not involved in the sealing action and to state of roughness cannot, then, affect the seal itself.

The absence of sealing elements on the shutter, moreover, allows it to have a profile, in the direction of the flow, as illustrated in FIG. 5, which results in reduced formation of turbulence and allows a gradual acceleration and an equal gradual recovery of pressure of the fluid at the passage around it, so rendering the head losses due to its presence very little, and negligible in most uses.

The presence of the metal reinforcement inside the sealing element allows the elastomeric material it is made of to be chosen based on its best characteristics from the point of view of the seal and the resistance to the fluid, regardless of its mechanical resistance. This permits use of the valve, with various fluids and not just water, as well as gases, compressed air and the like.

What is claimed is:

1. A butterfly valve, comprising:

a tubular valve body having fittings at opposite ends for connection to a conduit, a substantially cylindrical seat between said fittings, a shaft bore formed in said body and opening into said seat transversely to an axis thereof, an inwardly extending annular ledge projecting from said seat at one axial end of said seat, and a pair of annular grooves formed in said seat at opposite axial ends thereof;

a seal of elastomeric material received in said seat and axially abutting said ledge, said seal being formed with a metal ring at least partially embedded in said elastic material and extending substantially over the entire length of said seal, said ring having a median portion of an outer diameter equal to an outer diameter of said seal and directly resting against said seat and end portions set inwardly from said seat whereby thicknesses of said elastomeric material separate said end portions from said seat, said seal being formed with a hole aligned with said bore and said ring having an opening with an edge set back from said hole, said seal further comprising a pair of annular ribs along an outer periphery of said seal and formed of said elastomeric material, said ribs being dimensioned to be received in said grooves under elastic compression, said end portions of said ring overlapping said ribs, said seal having a layer of said elastic material inwardly of said median portion;

a disk-shaped shutter received in said seal and having a periphery resiliently engaging said layer;

a shaft rotationally coupled with said disk-shaped shutter, traversing said bore and said hole and sealingly engaged by a portion of said material between said edge and said hole; and means for rotating said shutter connected to said shaft externally of said body.

2. The butterfly valve defined in claim 1 wherein said elastomeric material sealingly engages said disk along areas laterally of a meridian plane of symmetry of said disk.

3. The butterfly valve defined in claim 1 wherein said shutter is formed with a bore extending diametrically through said shutter and traversed by said shaft, said shaft being formed with a milled profile forceably mating with said shutter for angularly coupling said shaft with said shutter.

4. The butterfly valve defined in claim 1 wherein said shutter is formed with a milled profile angularly coupling said shaft is formed with a filled profile angularly coupling said shaft with said shutter.

5. The butterfly valve defined in claim 1 wherein said ribs have semicircular cross sections.

* * * * *